United States Patent
Zeigler et al.

(10) Patent No.: US 9,332,122 B2
(45) Date of Patent: May 3, 2016

(54) SYSTEM AND METHOD FOR IDENTIFYING E-911 CALLS AND NOTIFYING FAMILY MEMBERS/FRIENDS OF THE CALLER

(75) Inventors: John Zeigler, Lee's Summit, MO (US); Jeffrey L. Leister, Lenexa, KS (US); Cadathur V. Chakravarthy, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1203 days.

(21) Appl. No.: 12/365,611

(22) Filed: Feb. 4, 2009

(65) Prior Publication Data

US 2010/0195805 A1 Aug. 5, 2010

(51) Int. Cl.
*H04M 11/04* (2006.01)
*H04M 3/51* (2006.01)
*H04M 3/42* (2006.01)

(52) U.S. Cl.
CPC ........ *H04M 3/5116* (2013.01); *H04M 3/42161* (2013.01); *H04M 3/42382* (2013.01); *H04M 11/04* (2013.01); *H04M 2242/30* (2013.01)

(58) Field of Classification Search
CPC .......... H04M 3/5116; H04M 1/72536; H04M 2242/04
USPC .......... 379/37, 38, 40, 41, 45, 47, 51, 205.01; 455/404.1, 521
See application file for complete search history.

(56) References Cited

U.S. PATENT DOCUMENTS

| | | | |
|---|---|---|---|
| 4,908,845 A * | 3/1990 | Little | 379/51 |
| 5,195,126 A * | 3/1993 | Carrier et al. | 379/45 |
| 5,805,670 A * | 9/1998 | Pons et al. | 379/45 |
| 6,151,385 A * | 11/2000 | Reich et al. | 379/49 |
| 6,427,001 B1 * | 7/2002 | Contractor et al. | 379/45 |
| 6,801,780 B1 * | 10/2004 | Foladare et al. | 455/458 |
| 7,046,140 B2 * | 5/2006 | Adamczyk et al. | 340/539.18 |
| 7,145,462 B2 * | 12/2006 | Dewing et al. | 340/573.1 |
| 2004/0072583 A1 * | 4/2004 | Weng | 455/456.3 |
| 2008/0304630 A1 * | 12/2008 | Nguyen et al. | 379/45 |

\* cited by examiner

*Primary Examiner* — Duc Nguyen
*Assistant Examiner* — Kile Blair
(74) *Attorney, Agent, or Firm* — Swanson & Bratschun, L.L.C.

(57) ABSTRACT

In one embodiment of the present invention, a method and system may be provided for providing notification that an emergency call is being placed. The system and method includes identifying a telephone call as being an emergency call, identifying a calling party of the telephone call, locating a notification list associated with the identified calling party, and sending a notification to members on the notification list.

14 Claims, 2 Drawing Sheets

SYSTEM AND METHOD FOR IDENTIFYING E-911 CALLS AND NOTIFYING FAMILY MEMBERS/FRIENDS OF THE CALLER

BACKGROUND OF THE INVENTION

When an emergency arises, often times our family members or friends may not realize that something has happened to us, which may cause them confusion or concern. In some situations, a person seeking help from emergency services is either unable to or does not think to notify family members or trusted friends that they may be in danger. For example, if the caller is a victim of a cat crash and suddenly becomes unconscious after notifying 911, the caller's family may never know that anything happened to the caller.

BRIEF SUMMARY OF THE INVENTION

In one embodiment of the present invention, by providing a system and method for automatic notification of family members or trusted friends that a call has been placed for emergency services, additional help or support may be obtained for the caller. In one embodiment of the present invention, while routing a call to emergency services, a notification may be also delivered to one or more members of a notification list that have been pre-selected by the caller to be notified in the event of an emergency.

In one embodiment of the present invention, a method and system may be provided for providing notification of an emergency call being placed. In one embodiment, a telephone call may be identified as being an emergency call, a calling party of the telephone call may be identified, a notification list associated with the identified calling party may be located, and a notification may be sent to members on the notification list.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
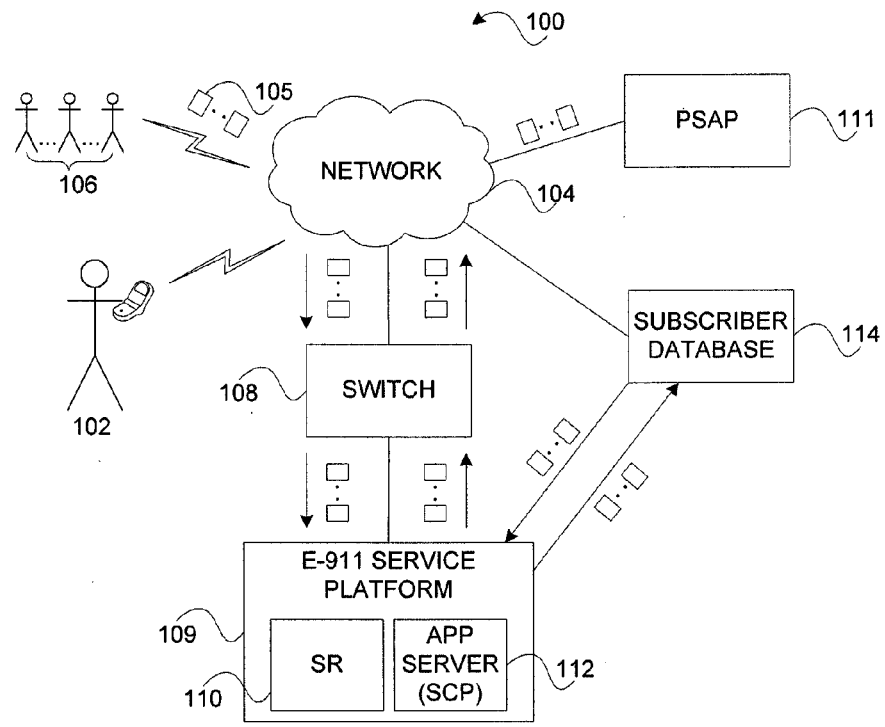
FIG. 1 is one embodiment of an environment for providing a notification to one or more parties that an emergency call is being placed.

FIG. 1 is one embodiment of an environment 100 for providing a notification to one or more parties that an emergency call is being placed. In one embodiment, a calling party 102 may initiate a call to 911 over a network 104, eventually resulting in the call arriving at a public safety answering point (PSAP), where the call will be handled by an emergency operator. When the calling party 102 initiates the call for emergency help, in addition to the call being routed to a PSAP, a notification 105 may also be sent to notification list members 106. The service for providing notification to notification list members may be referred to herein as "911 family notification," however, any person or persons the calling party chooses may be on a notification list.

In one embodiment, a call may be routed from the calling party 102 via the network 104 to a switch 108. The network 104 may be a traditional public service telephone network (PSTN), a VoIP network, a CDMA network, GSM network, the Internet, or any other network type operable to communicate call data. In general, the type of network 104 that is used is dependent upon the device type in which the calling party 102 is using. For example, the calling party 102 may be using an IP phone, a wireline telephone, a wireless device, or a variety of other devices, each of which may use a different network.

Switch 108 may be any suitable switch, soft switch, call manager, router, gateway, or other network interface. For example, the type of switch 108, may be dependent upon the network type. For example, for an IP network, the switch 108 may be a call server agent, for a wireline telephone, the switch 108 may be a PSTN switch, and for a wireless device, the switch 108 may be a mobile switching center (MSC). The switch 108 may further be in communication with an E-911 service platform 109.

The E-911 service platform 109 may provide the ability to select an appropriate PSAP, as well as the ability to identify notification list members 106 based upon information available to the E-911 service platform 109. In one embodiment, the E-911 service platform 109 may include a selective router (SR) 110, as well as an application server 112. The selective router 110 may be used to determine which PSAP a call is to be routed to, as well as perform the actual routing of the call to a PSAP. This selective router 110 may also perform a query of a subscriber database 114 in order to gather more specific information about the caller or the caller location. The gathered information may be used for determining which PSAP is most appropriate for the emergency call.

In one embodiment, the application server 112 may additionally, or in place of the selective router 110, query a subscriber database 114 in order to determine if the calling party is a subscriber to 911 family notification. The application server 112 may receive the information from the subscriber database 114 and initiate a notification 105 with notification list members 106. A notification 105 sent to the notification list members 106 may include a short message service (SMS) or text message, e-mail, pre-recorded phone message, or any other type notification in which notification list members 106 have the ability to access.

The amount of detail provided in the notification 105 may be determined by the calling party at the time the notification list members 106 are selected. For example, certain notification list members 106 may receive a notification that the calling party has initiated an emergency phone call and/or their location, while others may simply be requested to contact the calling party or a third party for additional information. Providing various levels of notification detail may allow for calling parties to customize the information, as much as possible, based upon the particular relationship they may have with the calling party member. Other limitations may be based upon the type of notification sent, such as an automatically generated SMS message or e mail message may allow for a time stamp and/or location code of where the calling party is located to be entered into the message, whereas a pre-recorded audio message may not.

In one embodiment, the subscriber database 114 may be an automatic location identification (ALI) database, which gathers information about subscribers. The application server 112 may be a service control point (SCP), which may include a 911 database used to determine which PSAP to route an emergency call. Rather than including both a selective router 110 and an application server 112, in one embodiment a single selective router 110 or a single application server 112 may perform the functions described above in one device.

In one embodiment, while the E-911 service platform 109 is determining an appropriate PSAP to route the emergency call, the E-911 service platform 109 may be concurrently routing separate notifications 105 to notification list members 106. The subscriber database 114 may be operable to not only include address and billing information as would ordinarily be in a subscriber database, but may also include information, such as whether or not the calling party 102 is a subscriber to a notification service. If it is determined that the calling party is a subscriber to a notification service, a notification list may be accessed in order for E-911 service platform 109 to be able to send notification 105 to the notification list members 106.

In one embodiment, in addition to determining which PSAP to route an emergency call, the subscriber database 114 may also provide location information to be included within a notification 105 to be sent to notification list members 106. Location information from the subscriber database 114 may be returned to the E-911 service platform 109, where the location information may be inserted within the notification 105. Alternatively, in certain embodiments, location information to be inserted may be generated by using triangulation of a cell signal, GPS coordinates provided by a GPS enabled phone operated by the calling party 102, or from location information communicated from the PSAP 111 in which the emergency call was routed. Location information may be inserted manually by an operator or automatically by a process within the PSAP.

In an embodiment where location information is communicated from the PSAP 111 to the E-911 service platform 109, additional types of information may also be communicated providing more detailed information for a notification 105. Example information included in a communication from the PSAP may include contact information of the emergency responder or responders, a location associated with the emergency responders, such as a particular hospital where the calling party is being taken, a code or other indicator associated with the type of emergency that was reported, or any other type of information capable of being communicated from the PSAP 111. In order to ensure the PSAP 111 is able to return available information to the E-911 service platform, an identification code unique to the calling party may be communicated between the E-911 service platform 109 and the PSAP 111 when the call is placed to the PSAP 111. When the PSAP 111 responds to the E-911 service platform with additional information, the identification code may be included within the message, allowing the E-911 platform to forward additional information by means of a notification 105 to appropriate notification list members 106.

Figure 2:
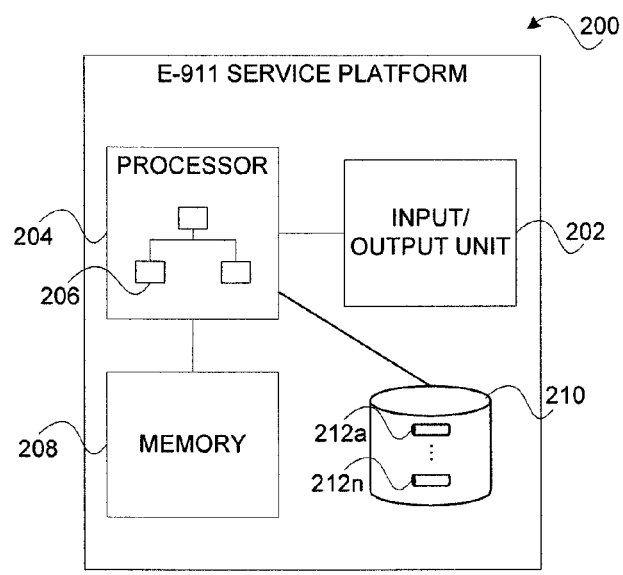
FIG. 2 is a block diagram of one embodiment of components of an E-911 service platform configured to provide notification to one or more parties than an emergency call is being placed.

FIG. 2 is a block diagram of one embodiment of components 200 of an E-911 service platform configured to provide notification to one or more parties than an emergency call is being placed. In one embodiment, the E-911 service platform 200 may include an input/output (I/O) unit 202 for receiving and communicating data, including calls, and commands between various servers, applications, and devices. For example, user information from a subscriber database and call data are some examples of data that may be received and communicated. The E-911 service platform 200 may also include a processor 204 for processing the commands related to call processing, call routing, notification generation and distribution, as well as many other functions. The processor 204 may execute software 206 capable of performing the functionality of the E-911 service platform 200. Software modules that operate in the software 206 are described below in more detail in reference to FIG. 3. Memory 208 may also be located within the E-911 service platform 200 for storing data being processed by the processor 204. A data storage unit 214 may also be included in or be in communication with the E-911 service platform 200. The data storage unit 210 may be a hard drive or any other type of volatile or non-volatile memory capable of storing data. Within the data storage unit 210 may be one or more data repositories 212a-212n, such as a database or multiple databases, capable of storing and organizing data. In one embodiment, rather than including the data storage unit 210, the E-911 service platform 200 may use a memory 208 that is large enough to store sufficient amounts of data. Components of the E-911 service platform 200 may be included as part of the selective router 110 or application server 112. However, these components may exist separately from either the selective router 110 or application server 112.

Figure 3:
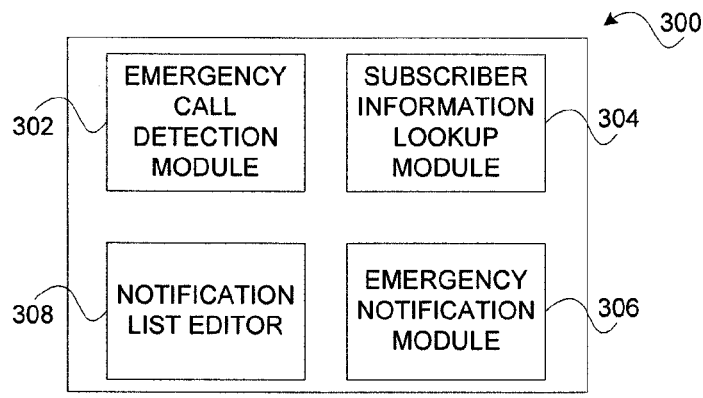
FIG. 3 is a block diagram of modules in one embodiment, configured to provide notification to one or more parties that an emergency call is being placed.

FIG. 3 is a block diagram of modules 300 in one embodiment, configured to provide notification to one or more parties that an emergency call is being placed. The modules described below are for one embodiment. However, some modules may not be used in other embodiments, and other embodiments may include additional modules. In one embodiment, an emergency call detection module 302 may be provided for determining, by an application server or a selective router, that an emergency call is occurring. The emergency call detection module 302 may be located within the E-911 service platform 109, as described previously, in either a selective router 110, an application server 112, or a similar device configured to detect that calls being placed are emergency calls. The emergency call detection module 302 may initiate a subscriber information lookup module 304, where a determination may be made as to whether the calling party is a subscriber to the notification service, as well as provide information as to what PSAP is most suitable to service the emergency call. The subscriber information lookup module 304 may access one or more databases containing information, including whether the calling party is a subscriber to the notification service and the names and preferred contact method of the notification list members for such calling party. In an alternative embodiment, the subscriber information lookup module 304 may be initiated by a module not specifically described herein, but that performs a similar function to the emergency call detection module 302. In one embodiment, subscriber information may be grouped together into a customer profile, whereby each customer can have access to his or her records in addition to their notification list.

An emergency notification module 306 may also be provided for communicating notifications to members of the notification list. The emergency notification module 306 may be located anywhere within the E-911 service platform 109, as described previously, and may be predominately used for the purpose of sending concurrent emergency notifications. In other words, the emergency notification module 306 may not be responsible, in at least one embodiment, for routing the actual call to a PSAP, but only in sending notification to members of the notification list. The emergency notification module 306 may also make the determination, based on information obtained from the subscriber information lookup module 304 or a similar module, about whether an emergency notification list exists for the particular calling party attempting an emergency call. If no notification list exists or the calling party is not a subscriber to the emergency notification service, the emergency notification module 306 would end processing at that point, and notification, apart from the emergency phone call would occur.

A notification list editor 308 may also be provided to allow calling parties for any subscribers to the emergency list notification to edit their notification list at any time. For example, when a subscriber signs up for voice service, the subscriber may use a web interface, speak directly with an operator, use an interactive voice response system, on any other method available to enter contacts to the notification list. The notification list editor 308 also may allow the subscriber the opportunity to edit the notification list on subsequent dates as well. For example, a user may no longer wish an ex-spouse, a former friend, or a deceased person to receive notification of an emergency. By providing the notification list editor 308, a user is allowed multiple options, or at least an option, to modify the notification list.

Figure 4:
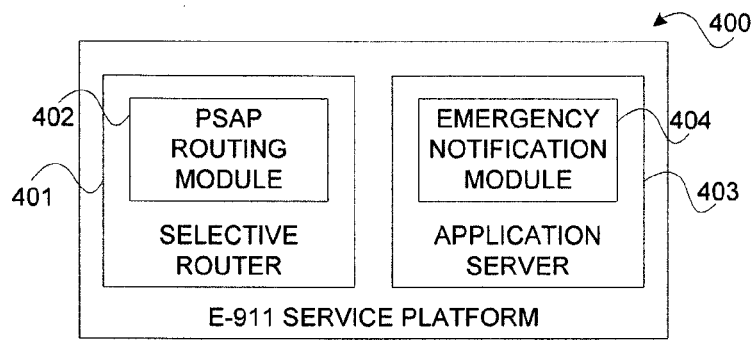
FIG. 4 is a block diagram of one embodiment of an E-911 service platform configured to provide notification to one or more parties that an emergency call is being placed.

FIG. 4 is a block diagram of an E-911 service platform 400 configured to provide notification to one or more parties that an emergency call is being placed. E-911 service platform 400 may include in one embodiment, a selective router 401 and an application server 403. Within the selective router 401 may be a PSAP routing module 402 which is operable to locate an appropriate PSAP based on information related to an emergency call and/or calling party. In one embodiment, the selective router 401 provides functionality similar to what the application server 403 provides, thereby making the application server 403 unnecessary. In another embodiment, in the event an application server 403 is present, the emergency notification module 404, or one or more similar modules, perform the functionality of gathering information from a subscriber database related to 911 family notification. If information is found for the particular calling party, the application server 403 using the emergency notification module 404, or a similar module, may be operable to send notification, such as an SMS text message, email, phone recording, or any other notification as determined by information located within the subscriber database. In one embodiment, rather than a single subscriber database, a separate emergency notification database may also be queried, which includes information predominately regarding notification settings and preferences that are separate from a traditional subscriber database, such as an ALI, described previously.

Figure 5:
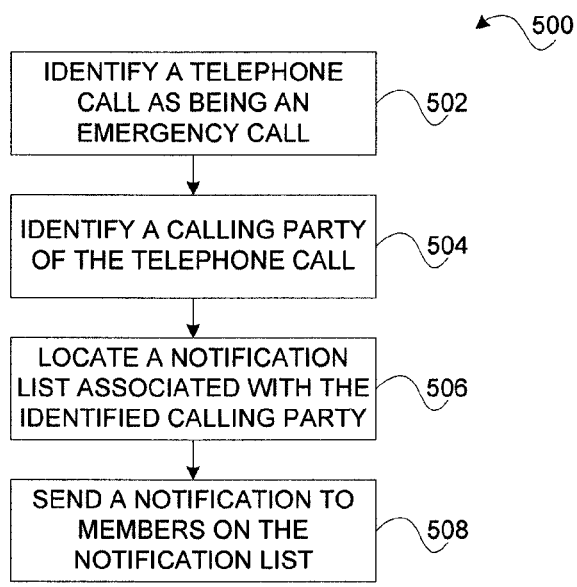
FIG. 5 is a flowchart of one embodiment of a method for providing notification of an emergency call being placed.

FIG. 5 is a flowchart of one embodiment of a method 500 for providing notification of an emergency call being placed. In step 502, a telephone call may be identified as being an emergency call. The switch 108 (from FIG. 1) may be operable to make the determination that a call is an emergency call, or another piece of network equipment not explicitly shown may provide the determination. The switch 108 may route the identified telephone call to the E-911 service platform 109 (from FIG. 1), where in step 504, a calling party of the telephone call may be identified. By identifying the calling party, the E-911 service platform 109 may be able to determine whether or not the calling party is a subscriber to emergency notification service. In step 506, a notification list associated with the identified calling party may be located. The notification list may be located in a subscriber database 114 (from FIG. 1), such as an ALI or home location register (HLR). In an alternative embodiment, the notification list may be located either within a selective router included within, or in communication with, the E-911 service platform 109 or within an application server 112 as described in FIG. 1. If a notification list is located for the calling party, in step 508 a notification or multiple notifications may be sent to members of the notification list. While not delaying the original emergency call, concurrently providing a notification to members of the notification list allows for an emergency situation to be known to relevant people as efficiently as possible.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for providing notification of an emergency call being placed, said method comprising:
    receiving a telephone call at an E-911 service platform, the E-911 service platform comprising a selective router and an application server;
    identifying, using a processor of the E-911 service platform, the telephone call as being an emergency call;
    identifying, by the E-911 service platform, a calling party of the telephone call;
    locating, by the selective router, an appropriate public safety answering point (PSAP) based on information related to the emergency call and the calling party;
    routing, by the selective router, a first message to the appropriate public safety answering point, wherein the first message includes the emergency call and an identification code unique to the calling party;
    receiving a second message from the appropriate public safety answering point, wherein the second message includes contact information of an emergency responder and the identification code unique to the calling party;
    query, by the application server, a subscriber database to determine if the calling party is a subscriber to 911 family notification;
    responsive to a determination that the calling party is a subscriber to 911 family notification, locating, by the application server, a notification list associated with the identified calling party; and
    automatically sending, by the application server, a notification to members on the notification list, wherein an amount of detail provided in the notification to each member is specified by one of a plurality of notification levels selected for that member by the calling party at the time the members of the notification list are selected, wherein at least one of —the plurality of notification levels includes the contact information of the —emergency responder received from the appropriate public safety answering point, and wherein sending the notification includes sending at least one of a text message, phone recording, and electronic mail as predetermined based on information located within the subscriber database.

2. The method according to claim 1, wherein identifying the calling party includes identifying a customer profile associated with the calling party.

3. The method according to claim 1, wherein locating a notification list associated with the identified calling party further includes accessing an e-911 database used to route calls to the public safety answering point (PSAP).

4. The method according to claim 1, wherein identifying a telephone call as an emergency call further comprises identifying a 911 call.

5. The method according to claim 1, wherein sending a notification further comprises sending a location associated with the calling party.

6. The method according to claim 5, wherein sending a notification further comprises sending a location where the calling party is located when the telephone call is placed.

7. The method according to claim 5, wherein sending a notification further comprises sending a location associated with an emergency responder to the emergency call.

8. A system for providing notification of an emergency call being placed, said system comprising:
- a selective router;
- an application server;
- a processor;
- a memory in communication with the processor, the memory being encoded with instructions, the instructions operable when executed by the processor to:
  - receive an indication of an emergency call;
  - identify a calling party associated with the emergency call;
  - locate, using the selective router, an appropriate public safety answering point (PSAP) based on information related to the emergency call and the calling party;
  - route, using the selective router, a first message to the appropriate public safety answering point, wherein the first message includes the emergency call and an identification code unique to the calling party;
  - receive a second message from the appropriate public safety answering point, wherein the second message includes contact information of an emergency responder and the identification code unique to the calling party;
  - query, using the application server, a subscriber database to determine if the calling party is a subscriber to 911 family notification;
  - responsive to a determination that the calling party is a subscriber to 911 family notification, locate a notification list associated with the identified calling party; and
  - initiate a notification to members on the notification list, wherein an amount of detail provided in the notification to each member is specified by one of a plurality of notification levels selected for that member by the calling party at the time the members of the notification list are selected, wherein at least one of the plurality of notification levels includes the contact information of the emergency responder received from the appropriate public safety answering point, and wherein sending the notification includes sending at least one of a text message, phone recording, and electronic mail as predetermined based on information located within the subscriber database.

9. The system of claim 8, wherein identifying the calling party includes identifying a customer profile associated with the calling party.

10. The system of claim 8, wherein locating a notification list associated with the identified calling party further includes accessing an e-911 database used to route calls to the public safety answering point (PSAP).

11. The system of claim 8, wherein identifying a telephone call as an emergency call further comprises identifying a 911 call.

12. The method according to claim 8, wherein sending a notification further comprises sending a location associated with the calling party.

13. The method according to claim 12, wherein sending a notification further comprises sending a location where the calling party is located when the telephone call is placed.

14. The method according to claim 12, wherein sending a notification further comprises sending a location associated with an emergency responder to the emergency call.

* * * * *